United States Patent
Yu et al.

(10) Patent No.: US 8,813,014 B2
(45) Date of Patent: Aug. 19, 2014

(54) SEMICONDUCTOR DEVICE AND METHOD FOR MAKING THE SAME USING SEMICONDUCTOR FIN DENSITY DESIGN RULES

(75) Inventors: Shao-Ming Yu, Zhubei (TW); Chang-Yun Chang, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 349 days.

(21) Appl. No.: 12/649,875

(22) Filed: Dec. 30, 2009

(65) Prior Publication Data
US 2011/0156148 A1  Jun. 30, 2011

(51) Int. Cl.
| | |
|---|---|
| G06F 17/50 | (2006.01) |
| G06F 9/455 | (2006.01) |
| H01L 29/66 | (2006.01) |
| H01L 27/12 | (2006.01) |
| H01L 21/20 | (2006.01) |

(52) U.S. Cl.
USPC .......... 716/122; 716/51; 716/52; 716/54; 716/55; 716/132; 716/135; 716/138; 716/139; 257/206; 257/330; 257/347; 257/368

(58) Field of Classification Search
USPC ......... 716/51, 52, 54, 55, 122, 132, 135, 138, 716/139; 257/206, 330, 347, 368
See application file for complete search history.

(56) References Cited

U.S. PATENT DOCUMENTS

| | | | |
|---|---|---|---|
| 6,644,703 B1 * | 11/2003 | Levin et al. ................. 279/3 |
| 6,706,571 B1 | 3/2004 | Yu et al. | |
| 6,858,478 B2 | 2/2005 | Chau et al. | |
| 7,190,050 B2 | 3/2007 | King et al. | |
| 7,211,864 B2 * | 5/2007 | Seliskar ...................... 257/347 |
| 7,247,887 B2 | 7/2007 | King et al. | |
| 7,254,051 B2 * | 8/2007 | Takashima .................. 365/145 |
| 7,265,008 B2 | 9/2007 | King et al. | |
| 7,315,994 B2 * | 1/2008 | Aller et al. .................. 716/106 |

(Continued)

FOREIGN PATENT DOCUMENTS

| | | |
|---|---|---|
| TW | M363618 U1 | 8/2009 |
| TW | 200945088 A1 | 11/2009 |

OTHER PUBLICATIONS

Yoshida et al.; "A Full FinFET DRAM Core Integration Technology Using a Simple Selective Fin Formation Technique"; Publication Year: 2006; VLSI Technology, 2006. Digest of Technical Papers. 2006 Symposium on; pp. 34-35.*

*Primary Examiner* — Helen Rossoshek
(74) *Attorney, Agent, or Firm* — Duane Morris LLP (57) ABSTRACT

A method for designing a semiconductor ic chip includes dividing the chip into functional blocks such as a core portion and one or more other functional cells and applying design rules concerning the spatial arrangement of semiconductor fins to the core portion but not to the other functional cells. The design guidelines include the application of design rules to some but not all functional blocks of the chip, may be stored on a computer-readable medium and the design of the semiconductor ic chip and the generation of a photomask set for manufacturing the semiconductor ic chip may be carried out using a CAD or other automated design system. The semiconductor ic chip formed in accordance with this method includes semiconductor fins that are formed in both the core portion and the other functional cells but are only required to be tightly packed in the core portion.

19 Claims, 5 Drawing Sheets

(56) References Cited

U.S. PATENT DOCUMENTS

| | | | |
|---|---|---|---|
| 7,465,973 B2 | 12/2008 | Chang et al. | |
| 7,508,031 B2 | 3/2009 | Liu et al. | |
| 7,528,465 B2 | 5/2009 | King et al. | |
| 7,560,784 B2* | 7/2009 | Cheng et al. | 257/401 |
| 7,605,449 B2 | 10/2009 | Liu et al. | |
| 7,696,040 B2* | 4/2010 | Zhu | 438/239 |
| 7,709,893 B2* | 5/2010 | Bauer et al. | 257/350 |
| 7,728,381 B2* | 6/2010 | Kahng et al. | 257/330 |
| 7,795,096 B2* | 9/2010 | Wang | 438/270 |
| 7,812,373 B2* | 10/2010 | Bauer et al. | 257/206 |
| 7,862,962 B2* | 1/2011 | Shieh et al. | 430/5 |
| 7,956,387 B2* | 6/2011 | Schloesser | 257/220 |
| 8,023,020 B2* | 9/2011 | Moini et al. | 348/294 |
| 8,026,138 B2* | 9/2011 | Lee | 438/239 |
| 8,039,179 B2* | 10/2011 | Shieh et al. | 430/5 |
| 8,404,133 B2* | 3/2013 | Sakuma et al. | 216/41 |
| 8,407,656 B2* | 3/2013 | Hook et al. | 716/136 |
| 2005/0153490 A1 | 7/2005 | Yoon et al. | |
| 2007/0120156 A1 | 5/2007 | Liu et al. | |
| 2007/0122953 A1 | 5/2007 | Liu et al. | |
| 2007/0122954 A1 | 5/2007 | Liu et al. | |
| 2007/0128782 A1 | 6/2007 | Liu et al. | |
| 2007/0132053 A1 | 6/2007 | King et al. | |
| 2008/0263492 A1* | 10/2008 | Chuang et al. | 716/10 |
| 2008/0290470 A1 | 11/2008 | King et al. | |
| 2008/0296632 A1 | 12/2008 | Moroz et al. | |
| 2009/0007036 A1* | 1/2009 | Cheng et al. | 716/5 |
| 2009/0181477 A1 | 7/2009 | King et al. | |
| 2010/0183958 A1* | 7/2010 | Inaba | 430/5 |
| 2010/0183961 A1* | 7/2010 | Shieh et al. | 430/30 |
| 2010/0282444 A1 | 11/2010 | Lin et al. | |
| 2010/0287518 A1* | 11/2010 | Becker | 716/9 |
| 2011/0049735 A1* | 3/2011 | Sakuma et al. | 264/1.24 |
| 2011/0115024 A1* | 5/2011 | Lee et al. | 257/368 |
| 2011/0175165 A1* | 7/2011 | Yu et al. | 257/347 |
| 2011/0233679 A1* | 9/2011 | Chen et al. | 257/368 |
| 2012/0146145 A1* | 6/2012 | Anderson et al. | 257/347 |
| 2014/0077303 A1* | 3/2014 | Baek | 257/365 |

* cited by examiner

SEMICONDUCTOR DEVICE AND METHOD FOR MAKING THE SAME USING SEMICONDUCTOR FIN DENSITY DESIGN RULES

FIELD OF THE INVENTION

The present invention relates, most generally, to semiconductor integrated circuits and methods for designing and manufacturing the same. More particularly, the present invention relates to manufacturing semiconductor integrated circuit devices according to design rules requiring semiconductor fins to be relatively tightly packed in core device sections whereas isolated semiconductor fins are allowed in more densely packed cells of the integrated circuit device.

BACKGROUND

Semiconductor fins are widely used in advanced semiconductor manufacturing technology because of the increased integration levels they provide. For example, when transistor devices such as FinFET, fin field effect transistor, devices are formed they provide a gate width that may be larger, by an order of magnitude, than the gate width of a transistor formed on the same substrate section in which the semiconductor fin is formed. Semiconductor fins have a high aspect ratio, i.e. they generally include a height that exceeds their width. When semiconductor fin devices are formed using patterning processes such as photolithography and etching, they are subject to the same limitations and shortcomings that are essentially inherent in such patterning processes such as the difference in size and profile between nested fins and isolated fins. When isolated fins and groups of nested fins are formed simultaneously using the same patterning process, it is difficult to control the profiles of both types of fins and to produce the fins to have the same critical dimensions and profiles. Isolated fins tend to have degraded profiles and reduced critical dimensions.

Another shortcoming associated with fins that are comparatively isolated, i.e. fins that are not in a densely packed feature environment, is the peeling phenomenon. Semiconductor fins that are comparatively isolated tend to peel and detach from the substrate upon which they are formed thereby destroying device functionality and contaminating the processing chamber in which the peeling occurs.

It would therefore be desirable to produce fin devices that are not subject to the above-described shortcomings. It would be desirable to simultaneously produce isolated semiconductor fin devices along with tightly packed semiconductor fins such that the isolated fins are not prone to peeling and further that both the isolated fins and the nested or tightly packed fins are formed to include substantially similar profiles and critical dimensions.

The present invention addresses these needs.

SUMMARY OF THE INVENTION

To address these and other needs and in view of its purposes, an aspect of the present invention provides an integrated circuit comprising at least one core device portion and at least one dense component cell. The integrated circuit includes a plurality of semiconductor fins including semiconductor fins disposed in the core device portion and arranged according to a design rule requiring the semiconductor fins to be arranged to include a minimum packing density. Further semiconductor fins are disposed in the dense component cell or cells but are not required to be arranged in accordance with the design rule, i.e. the further semiconductor fins disposed in the dense cell component may be arranged as isolated semiconductor fins.

According to another aspect, the invention provides a method of designing a semiconductor integrated circuit. The method comprises dividing the semiconductor integrated circuit device into at least one core portion and at least one cell portion, designing the at least one core portion and the at least one cell portion to each include semiconductor fins, and applying a design rule requiring semiconductor fins to be arranged in groups of at least three adjacent semiconductor fins, to the at least one core portion, but not to the at least one cell portion. Each cell portion includes an average device feature density greater than a device feature density in the core portion.

According to another aspect, the invention provides a computer-readable storage medium encoded with a computer program to be executed by a computer for designing a semiconductor integrated circuit chip by dividing the semiconductor integrated circuit, ic, chip into a core portion and at least one cell portion, designing the core portion and the at least one cell portion to each include semiconductor fins, and applying a design rule requiring a minimum semiconductor fin packing density to the core portion but not to the at least one cell portion. Each cell portion includes an average device feature density greater than a device feature density in the core portion.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

DETAILED DESCRIPTION

Aspects of the invention include a semiconductor device, a method for forming a semiconductor device, a method for designing a semiconductor device and a computer-readable medium having encoded thereon a computer-readable program code which, when executed, causes a computer to design the semiconductor device.

More particularly, the present invention provides a computer implemented or other method for semiconductor device design and for semiconductor device mask manufacturing based on the design. An aspect of the invention is a computer system such as a CAD (Computer Aided Design) system for carrying out the method by executing design steps and providing lithography data to generate a mask set. Various CAD systems are available and may be used. Design information is input to the CAD system and program instructions may be provided to the CAD system to enable the CAD system to design the mask set. Lithography data produced by the computer implemented design method may be provided to a mask manufacturing tool which may manufacture the mask set based on the lithography data. The mask set is then used to form the semiconductor device, which may be an integrated circuit, ic chip or other device, using conventional fabrication methods.

The design information includes broad layout information, e.g., floorplan information which is a schematic representation of the placement of major functional blocks of the semiconductor ic chip. The major functional blocks may include one or more core device portions and one or more other device cells. The design information provides for designing the semiconductor ic chip and placing semiconductor fins in one or more core device portions according to a design rule and placing semiconductor fins in the other cells wherein the design rule is not applied to the other cells. The design information provides for carrying out the execution of floorplanning, including the location of the functional blocks and for the complete design of the semiconductor ic chip.

According to one aspect, the design information may be in the form of program instructions on a computer-readable storage medium. The invention provides a computer-readable storage medium encoded with a computer program to be executed by a computer such as a CAD system to design a semiconductor integrated circuit chip.

Figure 1:
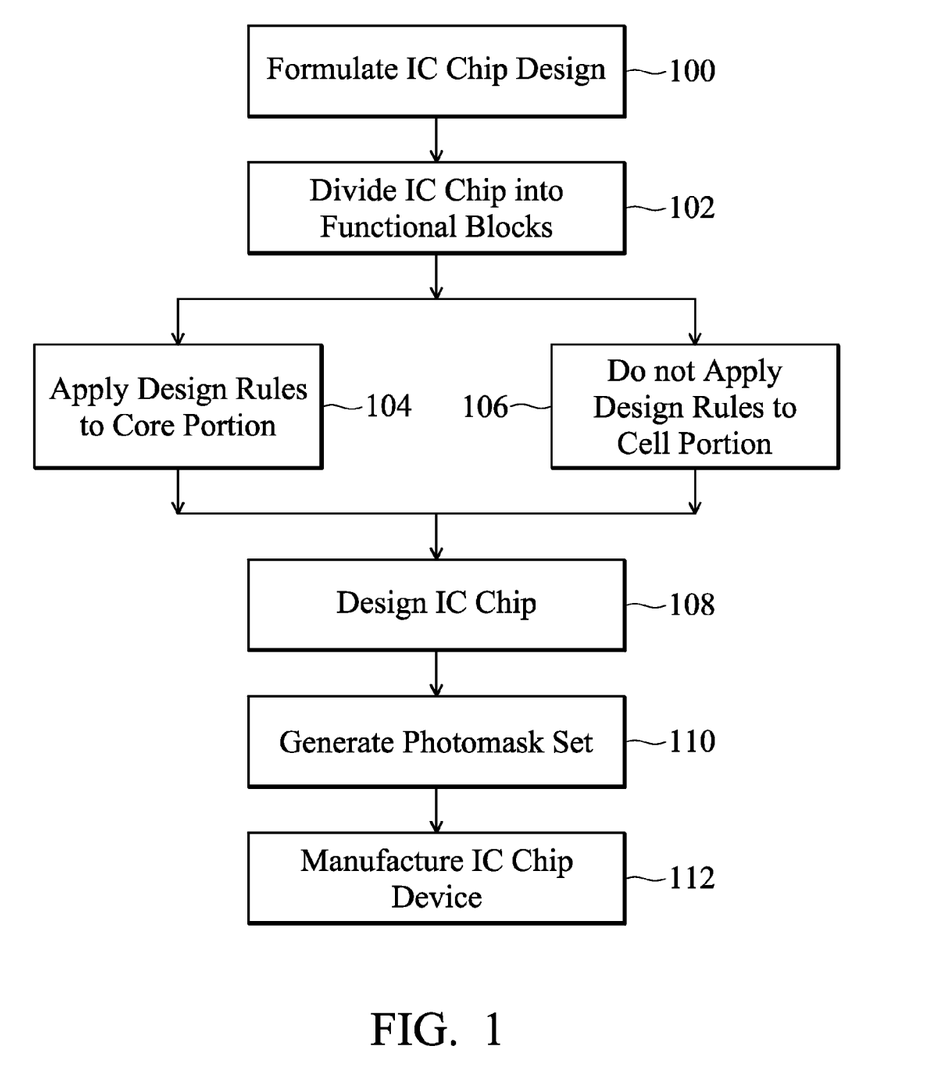
FIG. 1 is a flow chart illustrating a method of designing a semiconductor integrated circuit chip in accordance with the invention.

FIG. 1 is a flow chart illustrating aspects of the invention. At step 100, a semiconductor integrated circuit, ic, chip design is formulated. The ic chip may be any of various device types using various technologies and for various different purposes and applications. At step 102, the ic chip design is divided into functional blocks such as one or more core portions and one or more cells which have a higher feature density than the one or more core portions. The invention includes design guidelines in which a design rule is applied to the core portion or portions of the semiconductor device but not applied to the other cell portions, as seen in steps 104 and 106. At step 104, design rules regarding the spatial arrangement of semiconductor fins are applied to the core portion or portions and step 106 indicates that these design rules are not applied to the cells. At step 108, the complete integrated circuit chip is designed in accordance with the design guidelines. The complete design of the ic chip, including the design of the core portion or portions and the design of the cells, is carried out and both the core portions and the cells include semiconductor fins. The design rules regarding the spatial arrangement of semiconductor fins are applied to the core portion or portions but the cell portions are not required to follow the design rules. The rules for laying out and designing the ic chip design as in steps 102, 104, 106 and 108 may be stored as encoded instructions on a computer-readable medium such that a computer may carry out the instructions to perform the layout and design of the ic chip.

The layout and design of the ic chip which takes place at steps 102, 104, 106 and 108 may be carried out by a CAD (computer aided-design) system or other appropriate design system and will be based on and done in accordance with the instructions. The instructions on the computer-readable medium may also include other design rules and strategies for carrying out the complete design of the semiconductor ic chip. Based on the ic chip design, a photomask set is generated at step 110. At step 112, the integrated circuit chip is manufactured according to design and using the mask set.

Aspects of the invention will be discussed in further detail in reference to FIGS. 2-4, infra.

Figure 2:
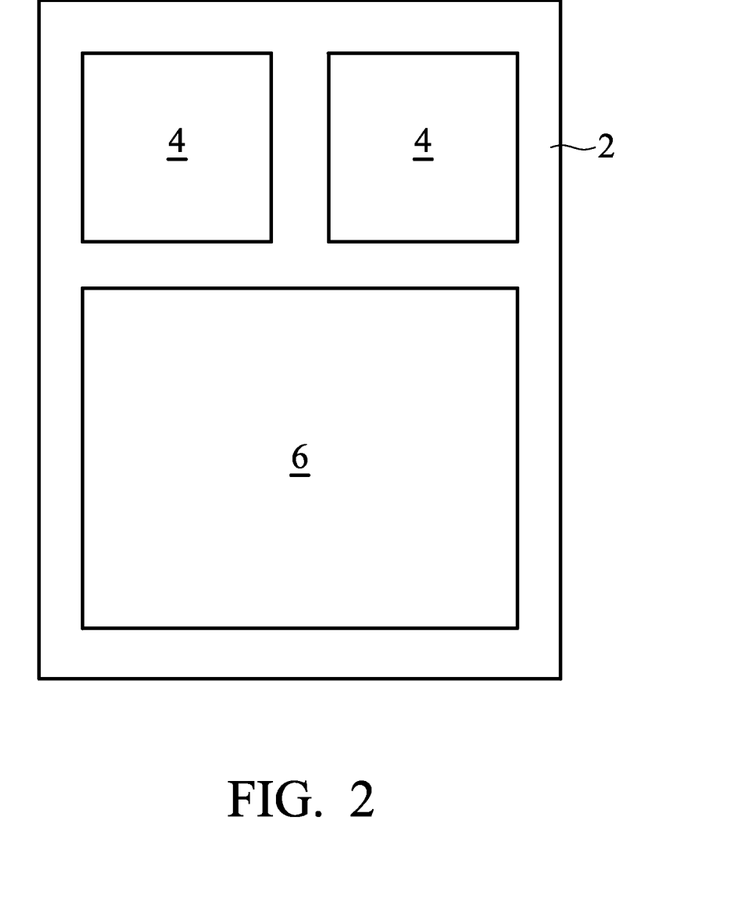
FIG. 2 is a plan view showing the layout of an integrated circuit chip including a core device portion and a plurality of dense component cells.

FIG. 2 is a plan view of an exemplary layout of an ic chip. IC chip 2 includes one core device portion 6 and two cells 4. It should be understood that this arrangement of functional blocks is exemplary only, i.e. the spatial arrangement on ic chip 2 of the two cells 4 and the single core portion 6 is exemplary only and other spatial arrangements on ic chip 2 may be used in other exemplary embodiments. Further, the illustrated layout that includes two cells 4 and one core portion 6 is also exemplary only and in other exemplary embodiments, there may be more than one core portion 6 and more or fewer cells 4.

Cells 4 include a higher device feature density than core portion 6. Various relative densities of features may be used in various exemplary embodiments. Cells 4 may each be a memory device such as an SRAM cell, a DRAM cell or various other memory devices. Core section 6 may be a logic device, various other microprocessor or other devices or any of various devices that carry out any of various functions. According to other exemplary embodiments, the functional blocks of ic chip 2 may include additional functional blocks that may be different from both cells 4 and core portion 6. It should be understood that the foregoing examples are intended to be exemplary only and an aspect of the invention is the application of design rules regarding the spatial arrangement of semiconductor fins to less dense portions of a semiconductor integrated circuit chip whereas other, more densely packed portions of the semiconductor integrated circuit chip include semiconductor fins but are not subject to the design rules regarding the spatial arrangement of semiconductor fins.

According to one exemplary embodiment, the design rule regarding the spatial arrangement of semiconductor fins relates to the packing density of the semiconductor fins and requires that at least three semiconductor fins are disposed adjacent one another. According to another exemplary embodiment, the design rule requires that at least four semiconductor fins are disposed adjacent one another. According to other exemplary embodiments, the design rule may require various packing densities, various numbers of adjacent semiconductor fins to be disposed adjacent one another and/or various other spatial arrangements of semiconductor fins. According to various other exemplary embodiments, the design rule may require a certain high packing density of semiconductor fin devices such that the majority of semiconductor fins are generally considered nested fins. According to yet other exemplary embodiments in which ic chip 2 includes more than two different types of functional blocks, a first design rule on semiconductor fin packing density may be applied to one type of functional block, a second design rule regarding semiconductor fin packing density may be applied to another type of functional block and a third type of functional block may not be subject to either of the design rules. The invention provides a design guideline in which one or more design rules regarding the spatial arrangement of semiconductor fins may be selectively applied to one or more functional blocks and not applied to other functional blocks.

Figure 3:
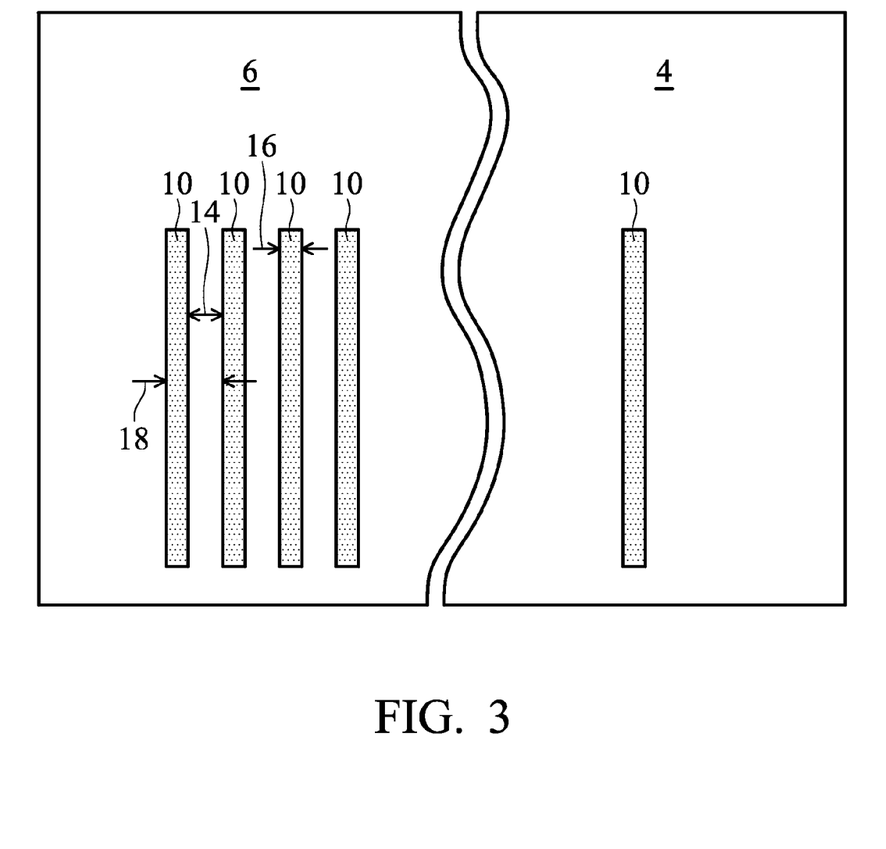
FIG. 3 is a plan view showing the layout of tightly packed semiconductor fins and an isolated semiconductor fin.

FIG. 3 is a plan view showing an exemplary aspect of the inventive design. FIG. 3 shows core device portion 6 in which four semiconductor fins 10 are packed tightly together. In the illustrated embodiment, four semiconductor fins 10 are formed generally adjacent one another, i.e. they are generally parallel to one another and in relatively close proximity as will be discussed infra. The four semiconductor fins 10 in core portion 6 therefore satisfy a design rule requiring at least three semiconductor fin devices to be formed adjacent one another and also a design rule requiring at least four semiconductor fin devices 10 to be formed adjacent one another. It can be seen that the design rule is not applied to cell 4 as cell 4 includes one isolated semiconductor fin 10.

In core device portion 6, the four semiconductor fins 10 include average width 16. Semiconductor fins 10 are spaced apart by spacing 14 and the adjacent semiconductor fin 10 array can also be described as an array of semiconductor fins 10 that includes pitch 18. Width 16 may vary from about 10-50 nm in various exemplary embodiments and may advantageously be in the range of about 13-17 nm in various exemplary embodiments. Spacing 14 may be about 35-80 nm in various exemplary embodiments and may be no greater than 65 nm in one advantageous embodiment. Pitch 18 may advantageously be about 50 nm in one exemplary embodiment, but may vary in other exemplary embodiments and take on a value of about 40 nm to about 100 nm in various exemplary embodiments. According to one advantageous embodiment, spacing 14 may be no greater than about five times the value of average width 16 of a semiconductor fin 10. According to another exemplary arrangement, spacing 14 may be no greater than about three times the average width 16 of semiconductor fins 10.

According to one design rule regarding the spatial arrangement of semiconductor fins in core portion 6, at least three or four or five semiconductor fins 10 are required to be situated adjacent one another. Adjacent is generally defined as being near to or next to but not necessarily touching. Adjacent indicates at least that the fins are in close proximity. They may be considered as part of an array. In various exemplary embodiments, the semiconductor fins may be arranged parallel to one another and in close proximity, e.g., without being limited to numerical values such as the examples provided supra, the spacing between the semiconductor fins is not significantly larger than the widths of the fins.

Figure 4:
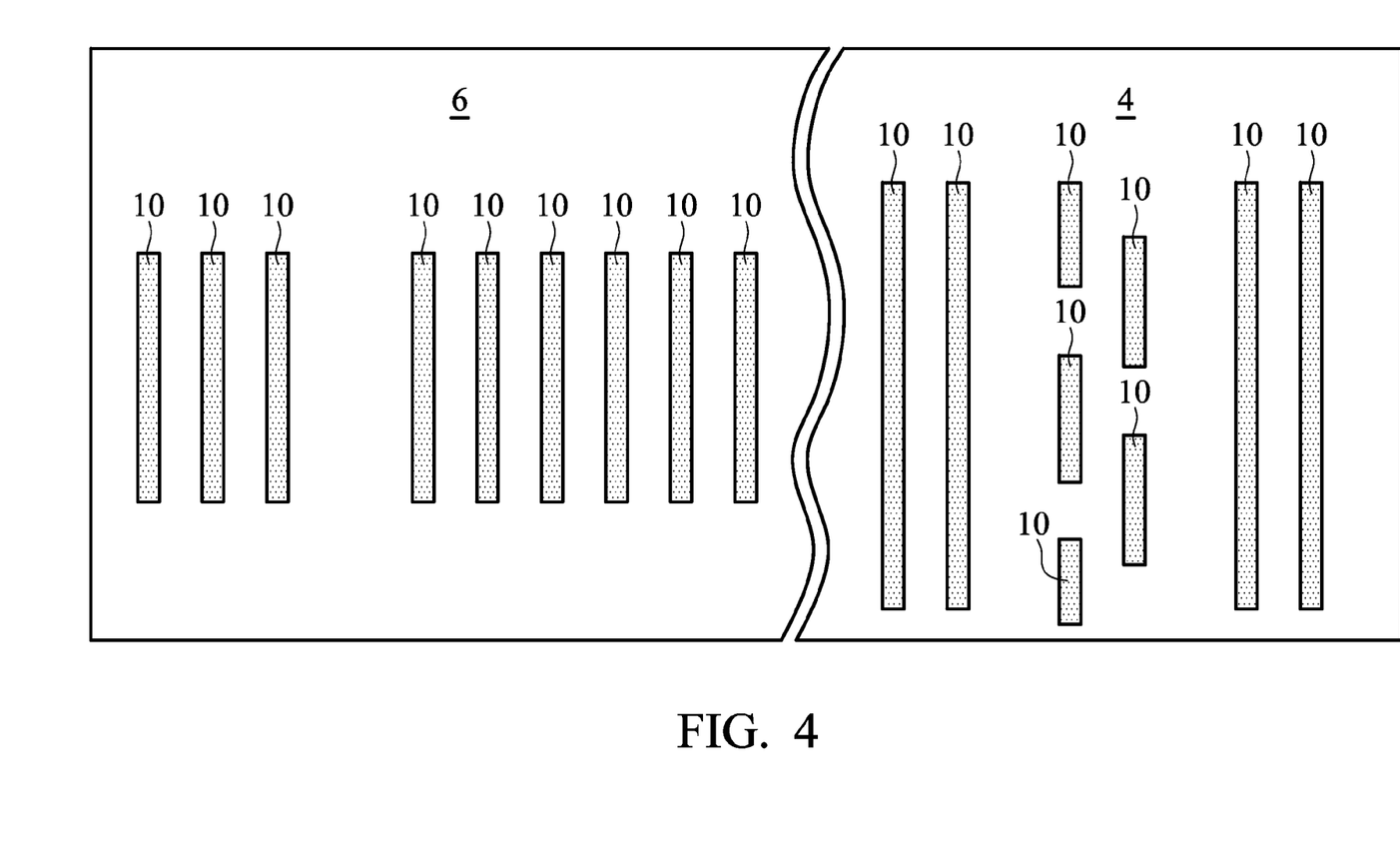
FIG. 4 is a plan view of a semiconductor integrated circuit chip layout including a design rule applied to semiconductor fins formed in one device portion and not applied to semiconductor fins formed in another device portion.

FIG. 4 shows another exemplary arrangement of semiconductor fins 10 and shows a design rule requiring at least three semiconductor fins 10 to be arranged adjacent one another applied to the core portion 6 but not applied to cell 4. In FIG. 4 it can be seen that core portion 6 includes one example of three semiconductor fins 10 arranged adjacent one another and one example of six semiconductor fins 10 arranged adjacent one another. In cell 4 of FIG. 4, however, it can be seen that no more than two semiconductor fins 10 are arranged adjacent one another. In cell 4, only the two left-most and two right-most semiconductor fins 10 are arranged adjacent one another and therefore the design rule requiring at least three semiconductor fins 10 to be arranged adjacent one another, is not applied to cell 4 of FIG. 4.

The above-described aspects of the invention, in particular the design of a semiconductor ic chip to include semiconductor fins in both core portions and in more densely packed cells, in accordance with design guidelines including the application of particular design rules to a core portion of a device but not to the design of more densely packed cells on the same semiconductor ic chip, may be encoded on a computer-readable medium as computer-readable program code which, when executed by a computer, causes the computer to design the semiconductor ic chip in accordance with the design rule guidelines and to generate a photomask set used to form the semiconductor ic chip. The invention also covers the manufacture of the semiconductor ic chip using the mask set so generated and using known processing methods.

Figure 5:
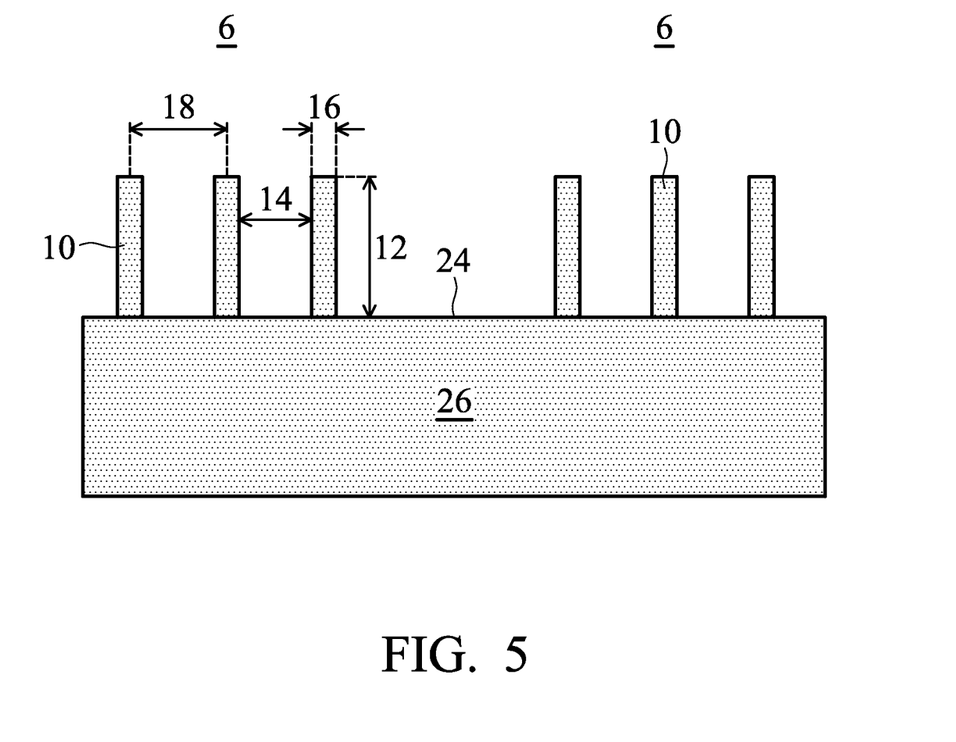
FIG. 5 is a cross-sectional view showing features of semiconductor fins formed over a substrate.

FIG. 5 provides a cross-sectional view of semiconductor fins 10 formed using such known processing methods and arranged in core portion 6 of a semiconductor device. Semiconductor fins 10 are formed over surface 24. Substrate 26 may be a silicon or other semiconductor wafer or it may be an SOI substrate or other substrate used in the semiconductor manufacturing industry. Surface 24 may be the top original surface of the silicon or other semiconductor wafer or it may represent a surface of a film formed over a semiconductor wafer or other substrate. Two groups of three semiconductor fins 10 arranged adjacent one another, are shown in FIG. 5. Semiconductor fins 10 may be formed of silicon, silicon germanium or other suitable semiconductor materials or combinations or composites thereof. Semiconductor fins may be formed using known processing methods such as a photolithographic patterning process followed by an etching process. Semiconductor fins 10 include height 12 which may range from 25-50 nm in various exemplary embodiments but other heights may be used in other exemplary embodiments and semiconductor fins 10 may generally include an aspect ratio (height:width) ranging from about 2:1 to 7:1 but other aspect ratios may be used in other exemplary embodiments. FinFET's, other transistors and other semiconductor devices may be formed on semiconductor fins 10 using known processing methods and various suitable known methods may be used to fabricate a complete semiconductor is chip device including the semiconductor fins, situated according to the aforementioned design guidelines.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the structure constructed in a particular orientation.

Although the invention has been described in terms of exemplary embodiments, it is not limited thereto. Rather, the appended claims should be construed broadly, to include other variants and embodiments, which may be made by those skilled in the art without departing from the scope and range of equivalents.

What is claimed is:
1. An integrated circuit comprising:
   at least one core device portion and at least one dense component cell; and
   a plurality of semiconductor fins including:

core semiconductor fins disposed in said at least one core device portion and arranged according to a design rule requiring a minimum packing density of said core semiconductor fins; and further semiconductor fins disposed in said at least one dense component cell but not arranged in accordance with said design rule, wherein said at least one dense component cell includes a first dense component cell with no more than a single one of said further semiconductor fins disposed therein.

2. The integrated circuit as in claim 1, wherein said design rule requires at least three said core semiconductor fins to be disposed adjacent one another.

3. The integrated circuit as in claim 2, wherein said design rule requires said core semiconductor fins to be arranged substantially parallel to one another and including a pitch no greater than about 65 microns.

4. The integrated circuit as in claim 2, wherein said core device portion comprises a logic device and said dense component cell comprises a memory cell.

5. The integrated circuit as in claim 1, wherein said dense component cell comprises an SRAM cell.

6. The integrated circuit as in claim 1, wherein said semiconductor fins include an aspect ratio ranging from about 2:1 to about 6:1 (height:width).

7. The integrated circuit as in claim 1, further comprising at least one transistor formed on at least some of said semiconductor fins.

8. An integrated circuit comprising:
   at least one core device portion and at least one dense component cell; and
   a plurality of semiconductor fins including:
   core semiconductor fins disposed in said at least one core device portion and arranged according to a design rule requiring a minimum packing density of said core semiconductor fins; and
   further semiconductor fins disposed in said at least one dense component cell but not arranged in accordance with said design rule,
   wherein said design rule requires at least three said core semiconductor fins to be disposed adjacent one another and further require said core semiconductor fins to be arranged substantially parallel to one another, and said core semiconductor fins include an average width and are spaced from one another by no greater than about 5 times said average width.

9. The integrated circuit as in claim 8, wherein said further semiconductor fins include individually disposed semiconductor fins.

10. A method of designing and manufacturing a semiconductor integrated circuit chip, said method comprising:
    dividing said semiconductor integrated circuit chip into functional blocks including a core portion and at least one cell portion,
    designing said core portion and said at least one cell portion to each include semiconductor fins,
    applying a design rule requiring said semiconductor fins to be arranged in groups of at least three adjacent semiconductor fins, to said core portion but not to said at least one cell portion, and
    manufacturing said integrated circuit chip in accordance with said design rule such that each said cell portion of said integrated circuit chip includes an average device feature density greater than an average device feature density in said core portion,
    wherein said design rule requires said core semiconductor fins to be arranged substantially parallel to one another and to be spaced from one another by a spacing no greater than about five times an average width of said semiconductor fins.

11. The method as in claim 10, further comprising further designing said core portion and said at least one cell portion.

12. The method as in claim 10, wherein said design rule requires said core semiconductor fins to be arranged substantially parallel to one another and to include a pitch no greater than about 65 microns.

13. The method as in claim 10, wherein said method includes designing said at least one cell portion to include isolated ones of said semiconductor fins.

14. The method is in claim 10, wherein said method is carried out by a computer.

15. A non-transitory computer readable storage medium encoded with a computer program to be executed by a computer for designing a semiconductor integrated circuit chip, said computer readable storage medium comprising program instructions for:
    dividing said semiconductor integrated circuit chip into functional blocks including a core portion and at least one cell portion;
    designing said core portion and said at least one cell portion to each include semiconductor fins; and
    applying a design rule requiring a minimum packing density for said semiconductor fins in said core portion but not applying said design rule to said at least one cell portion,
    wherein each said cell portion includes an average device feature density greater than an average device feature density in said core portion and said design rule requires said semiconductor fins to be arranged substantially parallel to one another and to be spaced from one another no greater than about five times an average width of said semiconductor fins.

16. The non-transitory computer-readable storage medium as in claim 15, wherein said design rule requires said semiconductor fins to be arranged in groups of at least three adjacent semiconductor fins.

17. The non-transitory computer-readable storage medium as in claim 16, wherein said design rule requires said semiconductor fins to be arranged substantially parallel to one another and to include a pitch no greater than about 65 microns.

18. The non-transitory computer-readable storage medium as in claim 16, wherein said core portion comprises a logic device and said cell portion comprises an SRAM cell.

19. The non-transitory computer-readable storage medium as in claim 15, wherein said at least one cell portion comprises two memory cells.

* * * * *